(12) United States Patent
Fujita et al.

(10) Patent No.: US 8,588,040 B1
(45) Date of Patent: Nov. 19, 2013

(54) THERMALLY ASSISTED MAGNETIC HEAD SLIDER, HEAD GIMBAL ASSEMBLY, AND HARD DISK DRIVE WITH THE SAME, AND MANUFACTURING METHOD THEREOF

(71) Applicants: SAE Magnetics (H.K.) Ltd., Hong Kong (CN); TDK Corporation, Tokyo (JP)

(72) Inventors: Yasutoshi Fujita, Hong Kong (CN); Ryuji Fujii, Hong Kong (CN); Hideki Tanzawa, Hong Kong (CN); Natsuo Nishijima, Hong Kong (CN); Tai Boon Lee, GuangDong (CN); Jian Hui Huang, GuangDong (CN); Huan Chao Liang, GuangDong (CN); Koji Shimazawa, Tokyo (JP); Kei Hirata, Tokyo (JP); Daisuke Miyauchi, Tokyo (JP)

(73) Assignees: SAE Magnetics (H.K.) Ltd., Hong Kong (CN); TDK Corporation, Tokyo (JP)

( * ) Notice: Subject to any disclaimer, the term of this patent is extended or adjusted under 35 U.S.C. 154(b) by 0 days.

(21) Appl. No.: 13/724,283

(22) Filed: Dec. 21, 2012

(30) Foreign Application Priority Data

Nov. 16, 2012 (CN) .......................... 2012 1 0465887

(51) Int. Cl.
*G11B 11/00* (2006.01)
(52) U.S. Cl.
USPC ................ 369/13.33; 369/13.13; 369/112.27; 360/59

(58) Field of Classification Search
USPC .......... 369/13.26, 13.33, 13.32, 13.24, 13.14, 369/13.03, 13.02, 13.12, 13.13, 13.22, 369/13.01, 13.35, 13.17, 112.27; 360/59, 360/125.31, 125.74
See application file for complete search history.

(56) References Cited

U.S. PATENT DOCUMENTS

| | | | |
|---|---|---|---|
| 8,000,178 B2 * | 8/2011 | Shimazawa et al. | ........ 369/13.33 |
| 8,059,496 B1 | 11/2011 | Zhou et al. | |
| 8,243,557 B2 * | 8/2012 | Stipe | .......................... 369/13.26 |
| 2009/0154020 A1 | 6/2009 | Fujii et al. | |
| 2010/0103553 A1 | 4/2010 | Shimazawa et al. | |

FOREIGN PATENT DOCUMENTS

JP 10-241112 9/1998

* cited by examiner

*Primary Examiner* — Ali Neyzari
(74) *Attorney, Agent, or Firm* — Nixon & Vanderhye PC

(57) ABSTRACT

A thermally assisted magnetic head slider includes an air bearing surface facing to a magnetic recording medium, a read portion, and a write portion including a write element, a waveguide for guiding light generated by the light source module, and a plasmon unit provided around the write portion and the waveguide. A first coat layer with a first thickness which has a first light absorption index is covered on an opposed-to-medium surface of the read portion, and a second coat layer with a second thickness which has a second light absorption index is covered on an opposed-to medium surface of the write portion, wherein the second thickness is larger than the first thickness, and the second light absorption index is smaller than the first light absorption index. The slider can protect the write portion and improve the reading performance of the read portion.

30 Claims, 13 Drawing Sheets

THERMALLY ASSISTED MAGNETIC HEAD SLIDER, HEAD GIMBAL ASSEMBLY, AND HARD DISK DRIVE WITH THE SAME, AND MANUFACTURING METHOD THEREOF

This application claims priority to Chinese Application No. 201210465887.2 filed 16 Nov. 2012, the entire contents of which is hereby incorporated by reference.

FIELD OF THE INVENTION

The present invention relates to a hard disk drive (HDD) and, more particularly, to a thermally assisted magnetic recording head slider, a head gimbal assembly (HGA), an HDD with the same, and a manufacturing method thereof.

BACKGROUND OF THE INVENTION

Hard disk drives are common information storage devices. FIG. 1a provides an illustration of a typical disk drive unit 100 essentially consisting of a series of rotatable disks 101 mounted on a spindle motor 102, and a Head Stack Assembly (HSA) 130 which is rotatable about an actuator arm axis 105 for accessing data tracks on disks during seeking. The HSA 130 includes at least one drive arm 104 a head gimbal assembly (HGA) 150. Typically, a spindling voice-coil motor (VCM) is provided for controlling the motion of the drive arm 104.

Referring to FIG. 1b, the HGA 150 includes a thermally assisted head slider 103 having a thermally assisted head 110, and a suspension 190 to load or suspend the thermally assisted head slider 103 thereon. The suspension 190 includes a load beam 106, a base plate 108, a hinge 107 and a flexure 109, all of which are assembled together. When the disk drive is on, a spindle motor 102 will rotate the disk 101 at a high speed, and the thermally assisted head slider 103 will fly above the disk 101 due to the air pressure drawn by the rotated disk 101. The thermally assisted head slider 103 moves across the surface of the disk 101 in the radius direction under the control of the VCM. With a different track, the thermally assisted head slider 103 can read data from or write data to the disk 101.

Referring to FIG. 1c, the thermally assisted head 110 has a substrate 1031 with an air bearing surface (ABS) 1032 processed so as to provide an appropriate flying height. The thermally assisted magnetic head 110 includes a write portion 121 having a write element 123 and read portion 122 having a read element. And a thermal energy source 111 is mounted on the substrate 1031 for providing heat energy to the thermally assisted magnetic head 110, such as a laser diode at or near the location of the write portion 121. Conventionally, the thermal energy source is bonded to the substrate 1031 via solders, for example. This thermal energy source provides energy to a portion of the magnetic recording medium, which reduces the medium's coercivity. After that, writing is performed by applying write magnetic field to the heated portion; therefore the writing operation is facilitated. Generally, the thermally assisted magnetic head 110 further includes a waveguide 125 and a plasmon antenna (PA) 127 or a plasmon generator (PG) located near the write element 123. The waveguide 125 is provided for guiding the laser light to the ABS 1032 by a surface of the PG 127, thereby providing near-field light, instead of directly applying the laser light to an element that generate near-field light. Such a PG and a waveguide are disclosed, for example, in US Patent Publication No 2010/0103553 A1 and U.S. Pat. No. 8,059,496 B1.

Conventionally, for preventing the read portion 122 and the write portion 121 from lacking magnetic or being impacted by the external environment, a over coat made by diamond-like carbon (DLC) for example, is covered on the top of all elements mentioned above to form the ABS 1032. However, such a DLC layer couldn't endure the high temperature during the writing operation for the thermally assisted magnetic head slider 103, which may absorb heat significantly and even may be disappeared. Thus the DLC has been replaced with a coat layer 131 with lower extinction coefficient (light absorption index) of complex refraction index made by SiOx, SiNx, SiOxNy, TaOx, TaNx, TaOxNy, hydrogenated amorphous carbon in the thermally assisted magnetic head slider, whose thickness is configured the thicker the better so as to avoid damage happened in the write portion 121 and read portion 122.

However, the thicker coat layer 131 covered on the top surface of the read portion 122 will increase the magnetic spacing between the magnetic recording medium surface and the read portion 122, which will degrade the reading performance of the read portion 122.

Accordingly, it is desired to provide improved thermally assisted magnetic head, HGA, HDD with the same, and a manufacturing method thereof to overcome the above-mentioned drawbacks.

SUMMARY OF THE INVENTION

One objective of the present invention is to provide a thermally assisted magnetic head slider, which can protect the write portion and improve the reading performance of the read portion.

Another objective of the present invention is to provide an HGA having a thermally assisted magnetic head slider, which can protect the write portion and improve the reading performance of the read portion.

Still another objective of the present invention is to provide an HDD having a thermally assisted magnetic head slider, which can protect the write portion and improve the reading performance of the read portion, and finally improve the performance of the HDD.

Yet another objective of the present invention is to provide a manufacturing method of a thermally assisted magnetic head slider, which can protect the write portion and improve the reading performance of the read portion.

To achieve above objectives, a thermally assisted magnetic head slider of the present invention includes a substrate having a light source module mounted thereon and an air bearing surface facing to a magnetic recording medium surface, a read portion having a read element, and a write portion including a write element, a waveguide for guiding light generated by the light source module, and a plasmon unit provided around the write portion and the waveguide and having a near-field light generating surface for propagating near-field light to the air bearing surface. And a first coat layer with a first thickness which has a first light absorption index is covered on an opposed-to-medium surface of the read portion, and a second coat layer with a second thickness which has a second light absorption index is covered on an opposed-to medium surface of the write portion, wherein the second thickness is larger than the first thickness, and the second light absorption index is smaller than the first light absorption index.

As an embodiment of the present invention, a distance between the opposed-to-medium surface of the write portion and the magnetic recording medium surface is longer than that between the opposed-to-medium surface of the read portion and the magnetic recording medium surface.

Preferably, the first coat layer and the second coat layer are formed at the same level substantially.

Preferably, the second coat layer is covered by a protective layer.

More preferably, the first and the second coat layers are covered by a protective layer.

As another embodiment of the present invention, the protective layer is recessed from a top of the air bearing surface with a predetermined distance at a position that is opposed to the near-field light generating surface of the plasmon unit.

Preferably, the second coat layer is recessed from a top of the air bearing surface with a predetermined distance at a position that is opposed to the near-field light generating surface of the plasmon unit.

As another embodiment of the present invention, a distance between the near-field light generating surface and the magnetic recording medium surface is longer than that of the opposed-to-medium surface of the write element and the magnetic recording medium surface.

As yet an embodiment of the present invention, a distance between an opposed-to-medium surface of the first coat layer and the magnetic recording medium surface is longer than that between an opposed-to-medium surface of the second coat layer and the magnetic recording medium surface.

Preferably, the first coat layer and/or the protective layer includes one or more materials selected from SiNx, AlNx, AlOx, SiNxOy, AlNxOy, WOx, BCxNy and diamond-like carbon.

The second coat layer include one or more materials selected from TaOx, SiOx, AlOx, WOx, BCxNy, AlNx, SiNx, AlOxNy, SiOxNy, TiOx, MgOx and ZrOx.

Preferably, the first thickness is in a range of 0.5 nm~5 nm, and the second thickness is in a range of 1 nm~10 nm.

Preferably, a seed layer is formed on the near-field light generating surface of the plasmon unit, and the seed layer includes metal, metal oxide, metal oxynitride or diamond-like carbon.

An HGA of the present invention includes a thermally assisted magnetic head slider having a substrate with a light source module mounted thereon and an air bearing surface facing to a magnetic recording medium, a read portion having a read element and a write portion, and a suspension supporting the thermally assisted magnetic head slider. The write portion includes a write element, a waveguide for guiding light generated by the light source module, and a plasmon unit provided around the write portion and the waveguide and having a near-field light generating surface for propagating near-field light to the air bearing surface. And a first coat layer with a first thickness which has a first light absorption index is covered on an opposed-to-medium surface of the write portion, and a second coat layer with a second thickness which has a second light absorption index is covered on an opposed-to medium surface of the read portion, wherein the first thickness is larger than the second thickness, and the first light absorption index is smaller than the second light absorption index.

An HDD of the present invention includes an HGA with a thermally assisted magnetic head slider, a drive arm to connect with the head gimbal assembly, a rotatable disk, and a spindle motor to spin the disk. The thermally assisted magnetic head slider has a substrate with a light source module mounted thereon and an air bearing surface facing to a magnetic recording medium, a read portion having a read element and a write portion. The write portion includes a write element, a waveguide for guiding light generated by the light source module, and a plasmon unit provided around the write portion and the waveguide and having a near-field light generating surface for propagating near-field light to the air bearing surface. And a first coat layer with a first thickness which has a first light absorption index is covered on an opposed-to-medium surface of the write portion, and a second coat layer with a second thickness which has a second light absorption index is covered on an opposed-to medium surface of the read portion, wherein the first thickness is larger than the second thickness, and the first light absorption index is smaller than the second light absorption index.

Accordingly, manufacturing method of a thermal assisted magnetic head slider of the present invention includes steps of:

(a) providing a wafer with a plurality of thermally assisted magnetic head slider elements each of which has an air bearing surface facing to a magnetic recording medium surface, a read portion including a read element and a write portion including a write element, a waveguide, and a plasmon unit;

(b) cutting the wafer into a plurality of row bars;

(c) lapping surfaces of the row bars so as to obtain a predetermined requirement;

(d) depositing a first coat layer with a first thickness which has a first light absorption index on an opposed-to-medium surface of the read portion;

(e) depositing a second coat layer with a second thickness which has a second light absorption index on an opposed-to-medium surface of the read portion, and the second thickness is larger than the first thickness, and the second light absorption index is smaller than the first light absorption index; and (f) cutting the row bar into a plurality of individual thermally assisted magnetic head slider.

As a preferred embodiment, the steps (d) and (e) includes sub-steps:

(d1) depositing the first coat layer on the opposed-to-medium surfaces of the read portion and the write portion;

(d2) etching the first coat layer covered on the write portion; and (e1) depositing the second coat layer on the opposed-to-medium surface of the write portion.

Preferably, etching way in the sub-step (d2) includes photo masking.

As a preferable embodiment of the present invention, the method further includes etching the opposed-to-medium surface of the write portion to form a step between the opposed-to-medium surfaces of the write portion and the read portion after the step (c) and before the step (f).

Preferably, the method further includes forming the first coat layer and the second coat layer at the same level substantially.

As another preferable embodiment, the method further includes forming a protective layer on the second coat layer. Preferably, the method further includes forming a protective layer on the first and second coat layers.

Preferably, the method further includes forming a recess on the protective layer at a position that is opposed to the near-field light generating surface of the plasmon unit.

As another preferable embodiment, the method further includes forming a recess on a near-field light generating surface of the plasmon unit to make a distance between the near-field light generating surface and the magnetic recording medium surface be longer than that of the opposed-to-medium surface of the write element and the magnetic recording medium surface.

Preferably, the method further includes forming a recess on the second coat layer at a position that is opposed to the near-field light generating surface of the plasmon unit.

As yet one preferable embodiment, a distance between an opposed-to-medium surface of the first coat layer and the magnetic recording medium surface is longer than that between an opposed-to-medium surface of the second coat layer and the magnetic recording medium surface.

In comparison with the prior art, on one hand, since the read portion is covered by the thinner first coat layer, thus the magnetic spacing between the magnetic recording medium surface and the read element is shortened comparing with the conventional design, which can improve the reading performance of the thermally assisted magnetic head slider. On the other hand, as the write portion is covered by the thicker second coat layer with lower light absorption material, thus the thicker second coat layer can endure the high temperature generated during writing operation, which is not easy to be corrosive due to its thickness.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Figure 1A:
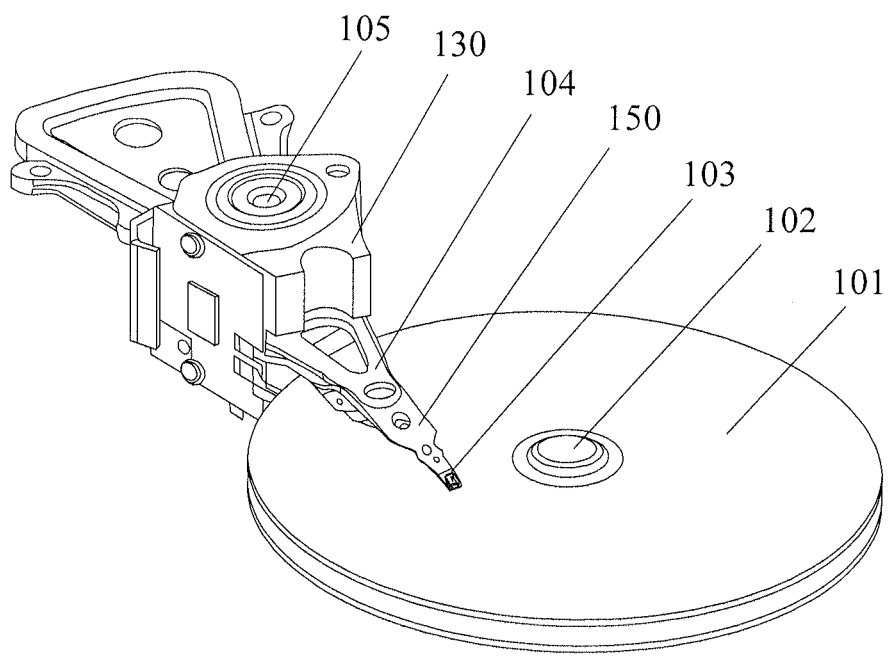
FIG. 1a is a partial perspective view of a conventional HDD.
Figure 1B:
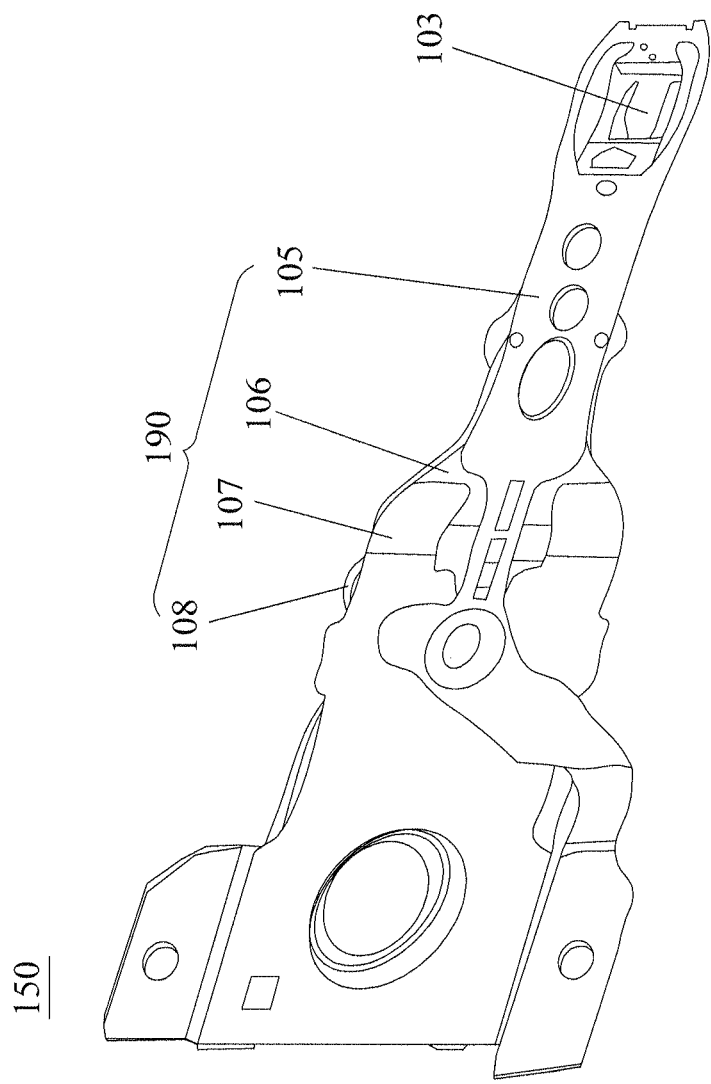
FIG. 1b is a partial top plan view of a conventional HGA.
Figure 1C:
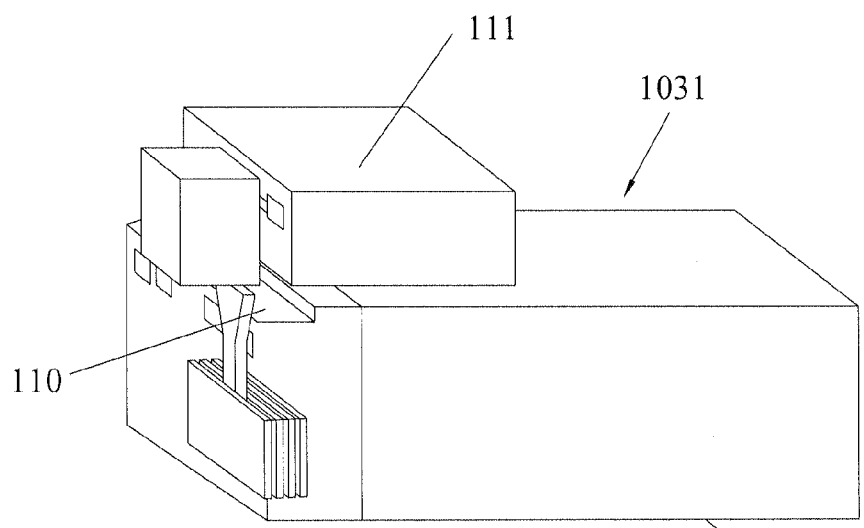
FIG. 1c is a perspective view of a conventional thermally assisted magnetic head slider having a conventional thermally assisted magnetic head.
Figure 1D:
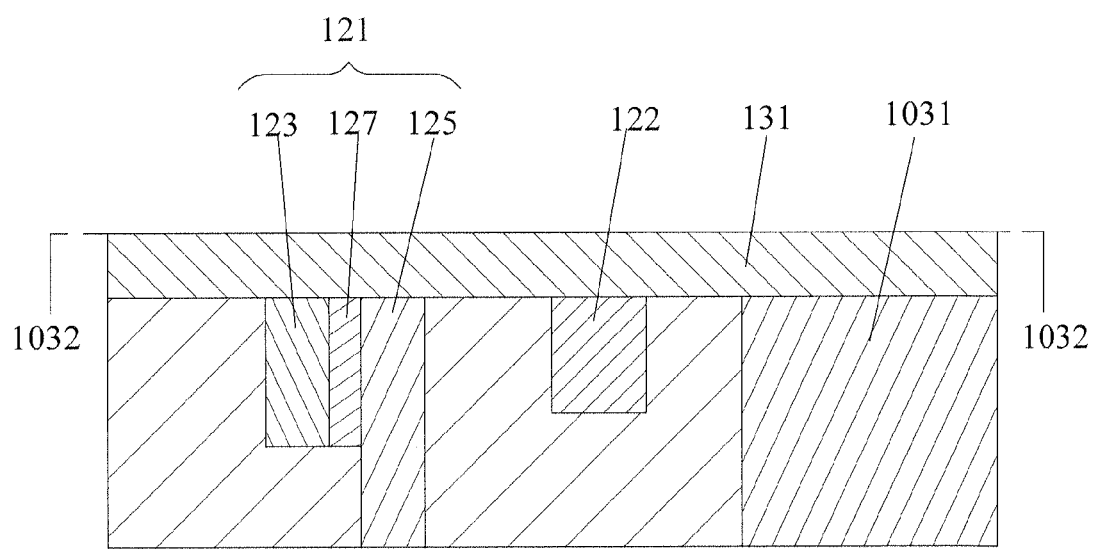
FIG. 1d is a cross-sectional view of a conventional thermally assisted magnetic head slider.

Various preferred embodiments of the invention will now be described with reference to the figures, wherein like reference numerals designate similar parts throughout the various views. As indicated above, the invention is directed to a thermally assisted magnetic head, HGA, HDD with the same, and directed to a manufacturing method thereof, thereby protecting the write portion and improving the reading performance of the thermally assisted magnetic head and enhancing the performance of the HDD finally.

Figure 2:
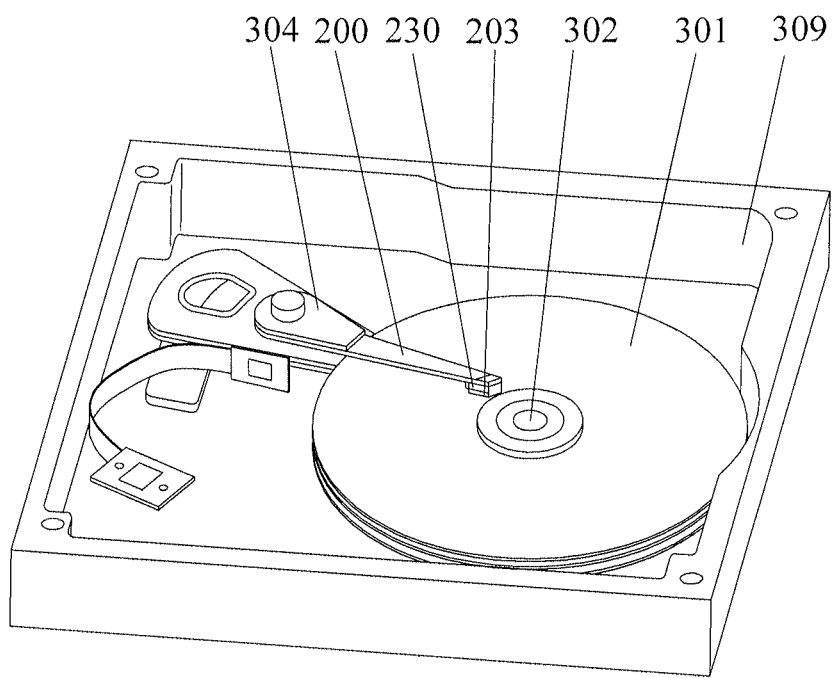
FIG. 2 is a perspective view of an HDD according to an embodiment of the invention.
Figure 3:
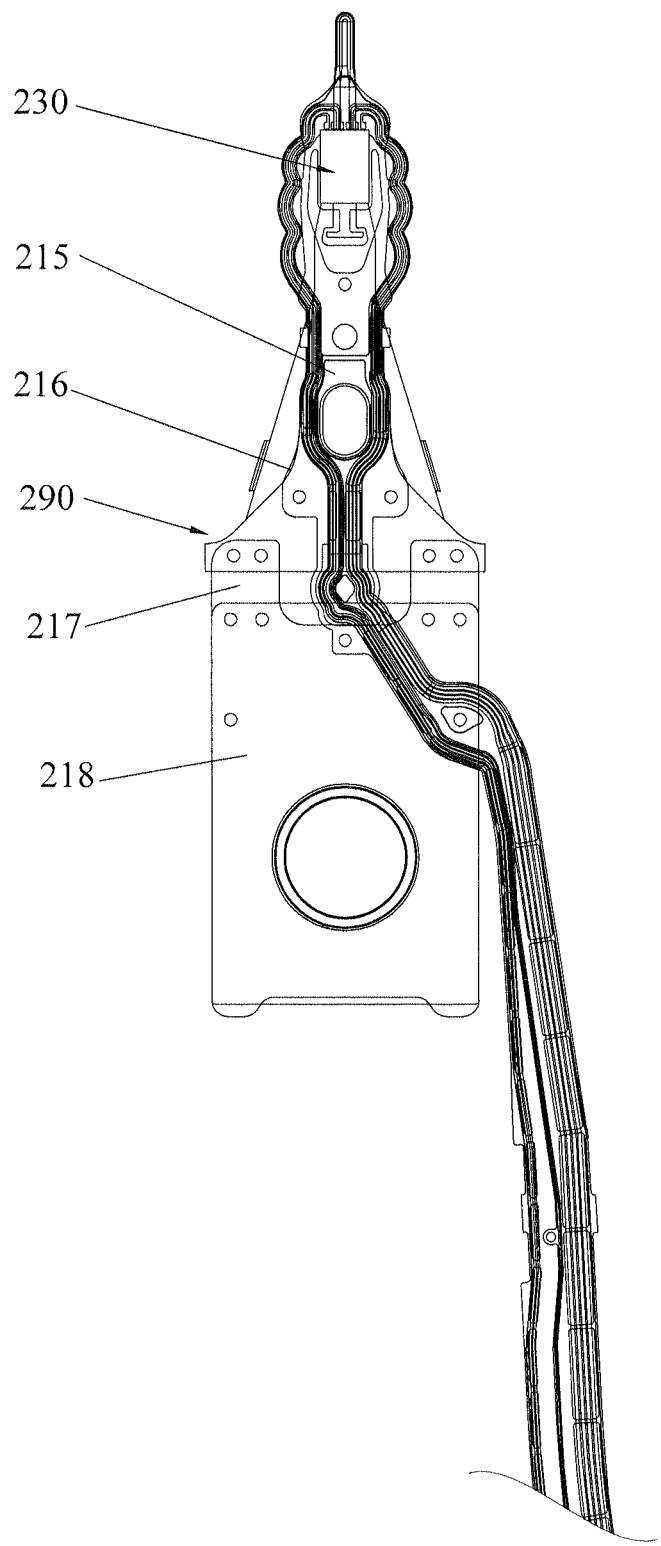
FIG. 3 is a perspective view of the HGA of the hard disk drive shown in FIG. 2.

FIG. 2 is a perspective view of an HDD according to an embodiment of the present invention. The HDD 300 includes several HGAs 200, drive arms 304 stacked and connected to the HGAs 200, a series of rotatable disks 301, and a spindle motor 302 to spin the disk 301, all of which are mounted in a housing 309. The structure of the HDD 300 according to the present invention is not limited to that described above. For example, the number of the rotatable disks 301, HGAs 200 and drive arms 304 may be one. As shown in FIG. 3, each HGA 200 includes a suspension 290 and a thermally assisted magnetic head slider 230 carried on the suspension 290 which has a thermally assisted magnetic head as a thin-film magnetic head for reading from and writing into the rotatable disks 301. The suspension 290 includes a load beam 216, a base plate 218, a hinge 217 and the flexure 215, all of which are assembled with each other. Specifically, the thermally assisted head 230 is carried on the flexure 215.

Figure 4:
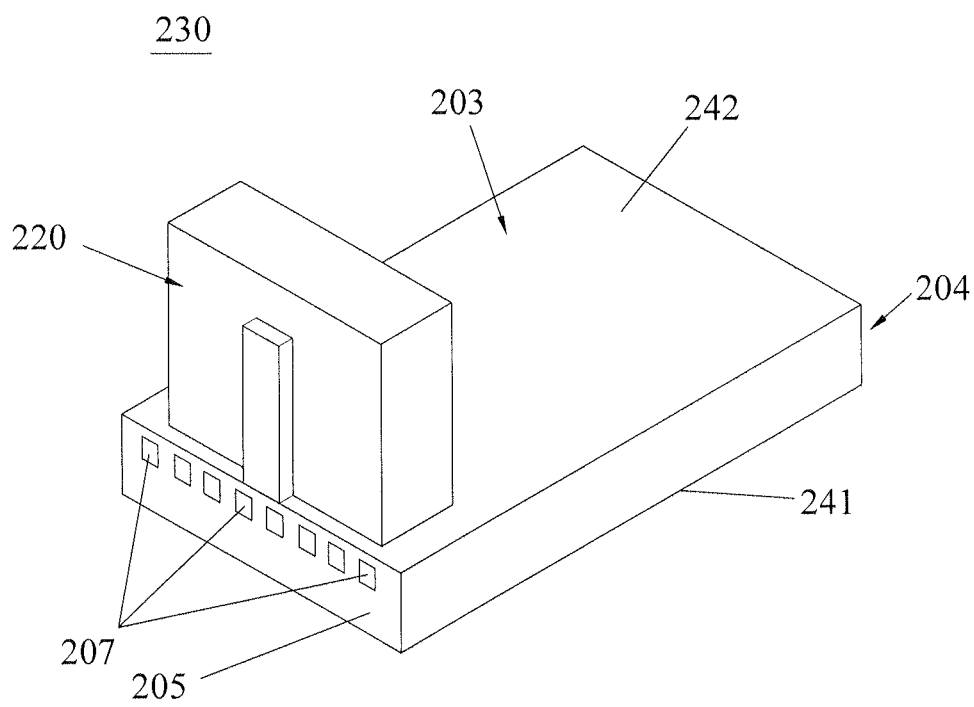
FIG. 4 is a perspective view of a thermally assisted magnetic head slider with a thermally assisted magnetic head according to an embodiment of the present invention.
Figure 5:
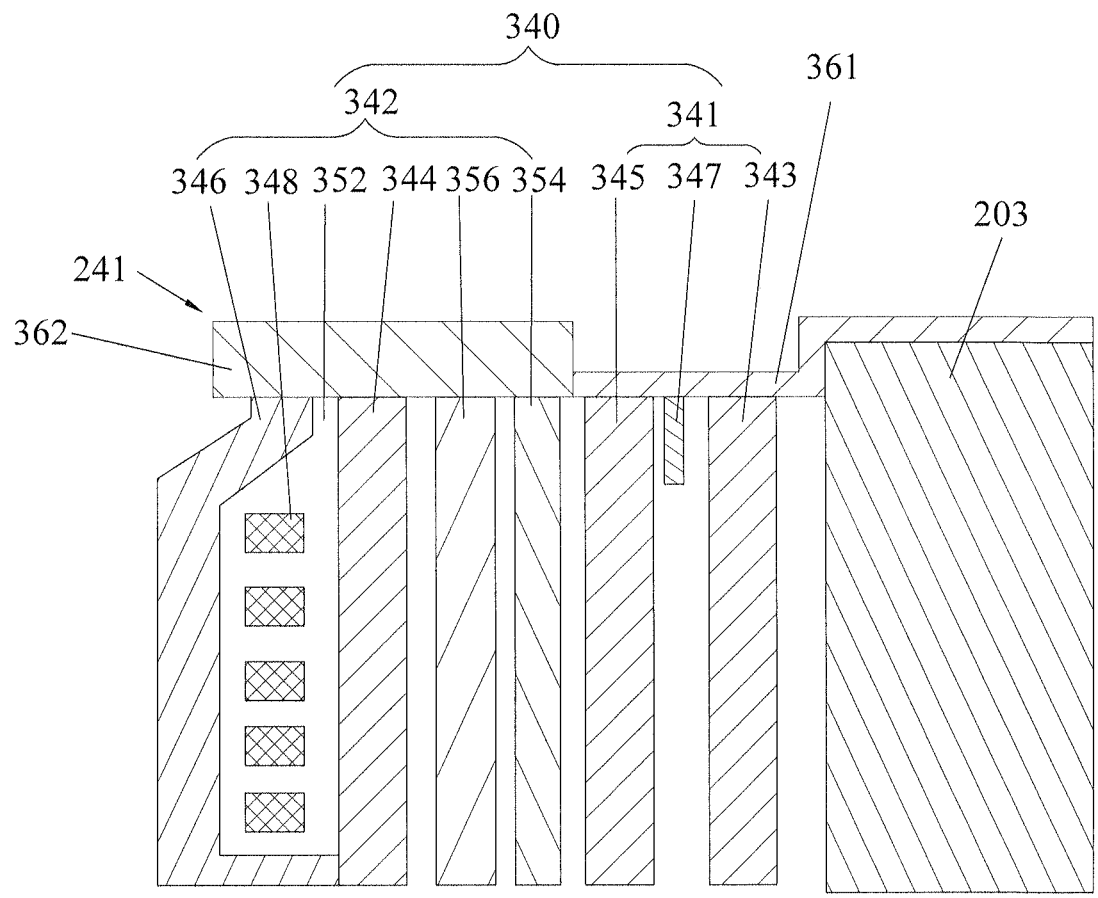
FIG. 5 is a cross-sectional view of the thermally assisted magnetic head slider shown in FIG. 4.

As shown in FIGS. 4-5, the thermally assisted magnetic head slider 230 includes a substrate 203, a thermally assisted magnetic head 340 embedded in the substrate 203 for reading and writing, and a light source module 220 formed on the substrate 203 for thermally assisted magnetic recording. In this embodiment, the light source module 220 is a laser diode module, but not limited to that.

Concretely, referring to FIG. 4 again, the thermally assisted magnetic head slider 230 includes a leading edge 204, a trailing edge 205, an ABS 241 facing to the disk and processed so as to provide an appropriate flying height, an opposing surface 242 opposite the ABS 241, and a thermally assisted magnetic head 340 embedded in the trailing edge 205. The trailing edge 205 has multiple bonding pads 207, such as eight, to couple with a suspension 209 of the HGA 200. Specifically, the light source module 220 is mounted on the opposing surface 242.

FIG. 5 is a cross-section view of the thermally assisted magnetic head 340. Concretely, thermally assisted magnetic head 340 includes a magnetoresistive (MR) read portion 341 formed on the substrate 203 and a write portion 343 formed on the MR read portion 341. For example, the MR read portion 341 can be Current Perpendicular to Plane (CPP) sensor, Current In Plane (CIP) sensor, tunnel magnetoresistive (TMR) sensor, giant magnetoresistive (GMR) sensor, or anisotropic magnetoresistive (AMR) sensor and the like.

In this embodiment, the MR read portion 341 includes a first shielding layer 343 formed on the substrate 203, a second shielding layer 345, and a MR element 347 sandwiched between the first and second shielding layers 343, 345. And a pair of hard magnet layers (not shown) is sandwiched therebetween as well and respectively placed on two sides of the MR element 347. And the MR read portion 341 further includes a non-magnetic insulating layer (not shown) formed at one side of the MR element 347 far from the ABS 241 of the thermally assisted magnetic head slider 230.

Referring to FIG. 5, the write portion 342 includes a write element having a first magnetic pole 344, a second magnetic pole 346, coils 348 and a first gap layer 362 sandwiched between the first and second magnetic poles 344, 346, and the write portion 342 further includes a waveguide 354 formed adjacent to the first magnetic pole 344 for guiding light generated by the light source module 220, and a plasmon unit 356 sandwiched between the first magnetic pole 344 and the waveguide 354 for propagating near-field light to the ABS 241. Commonly, the first magnetic pole 344 is a main pole, and the second magnetic pole 346 is a return pole. The plasmon unit 356 can be a plasmon generator or a plasmonon antenna. Concretely, the plasmon unit 356 includes a near-field light generating surface 3561 facing to the ABS 241. The plasmon unit 356 is made of nonmagnetic materials including Au, Ag, Cu, Al, Ti, Ta or Ge element, or alloy thereof such as, which has high light absorption characteristic and low light refraction index, and its thickness is in a range of 10 nm~1000 nm.

During reading and writing operations, the thermally assisted magnetic head 340 aerodynamically flies above the surface of the rotating disks 301 with a predetermined flying height. Thus, the ends of the MR read portion 341 and the write portion 342 face the surface of the magnetic recording layer (not shown) of the magnetic disk 301 with an appropriate magnetic spacing. Then the MR read portion 341 reads data by sensing signal magnetic field from the magnetic recording layer, and the write portion 342 writes data by applying signal magnetic field to the magnetic recording layer. When writing data, signal current is conducted through the coils 348 and flux is induced into the first and second magnetic poles 344, 346, which causes flux to fringe across the pole tips at the ABS 241. This flux magnetizes circular tracks on the rotating disk 301 during a write operation. Meanwhile, laser light is generated from the light source module 220, for example the laser diode, and propagated through the waveguide 354 and guided to the plasmon unit 356. Then, the near-field generating surface 3561 of the plasmon unit 356 will generate near-field light which may be propagated to the ABS 241. The generated near-field light reaches the surface of the magnetic disk 301, and heat a portion of the magnetic recording layer of the magnetic disk 301. As a result, the coercive force of the portion is decreased to a value that facilitates writing; thus the thermally assisted magnetic recording can be accomplished successfully.

Figure 6A:
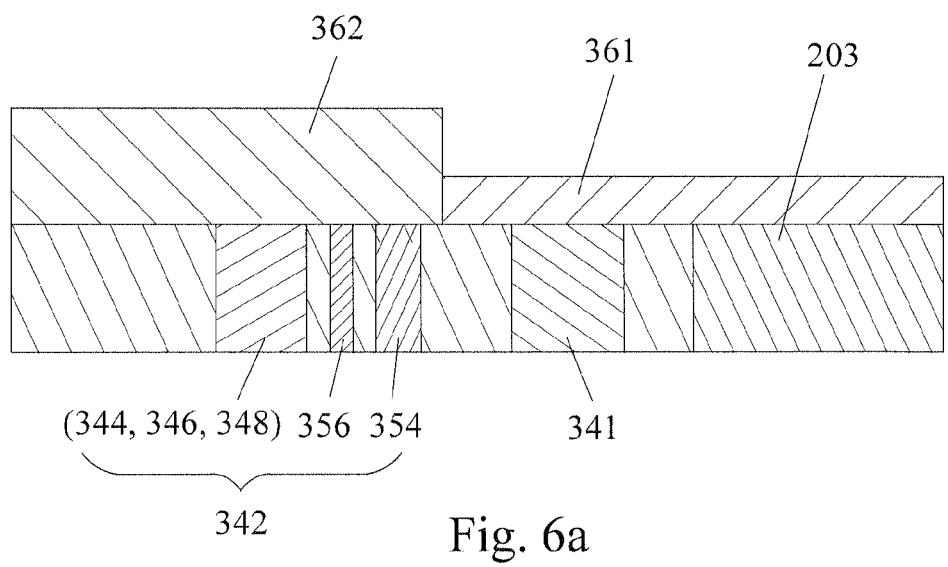
FIG. 6a is a simplified view of the thermally assisted magnetic head according to a first embodiment of the present invention.

Within the contemplation of the present invention, as shown in FIG. 6a, a first coat layer 361 with a first thickness is covered on the opposed-to-medium surface of the MR read portion 341, and a second coat layer 362 with a second thickness is covered on the opposed-to-medium surface of the write portion 342. The first coat layer 361 is made of high light absorption material such as SiNx, AlNx, AlOx, SiNxOy, AlNxOy, WOx, BCxNy or DLC, which is used for preventing the MR read portion 341 from lacking magnet. The second coat layer 362 is made of low light absorption material with low extinction coefficient of complex refraction index which is equal or smaller than 0.1, specifically, such as TaOx, SiOx, AlOx, WOx, BCxNy, AlNx, SiNx, AlOxNy, SiOxNy, TiOx, MgOx and ZrOx. Preferably, the second thickness of the second coat layer 362 whose range is 1 nm~10 nm is larger than the first thickness of the first coat layer 361 whose range is 0.5 nm~5 nm.

On one hand, since the MR read portion 341 is covered by the thinner first coat layer 361, thus the magnetic spacing between the magnetic recording medium surface and the MR element 347 is shortened comparing with the prior art, which can improve the reading performance of the thermally assisted magnetic head slider 230. On the other hand, as the write portion 342 is covered by the thicker second coat layer 362 with lower light absorption material, thus the thicker second coat layer 362 can endure the high temperature generated during writing operation, which can effectively protect the write portion 342 due to its thicker thickness.

In this embodiment, the opposed-to-medium surfaces of the read portion 341 and the write portion 342 are formed at the same level basically, namely the distance between the opposed-to-medium surface of the write portion 342 and the magnetic recording medium surface is equal to that between the opposed-to-medium surface of the read portion 341 and the magnetic recording medium surface basically. And the distance between an opposed-to-medium surface of the first coat layer 361 and the magnetic recording medium surface is longer than that between an opposed-to-medium surface of the second coat layer 362 and the magnetic recording medium surface.

Figure 6B:
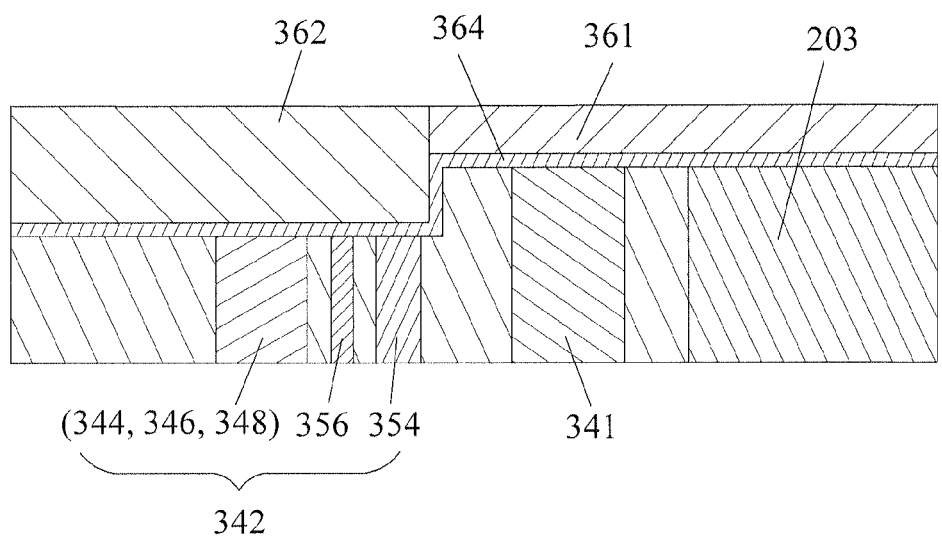
FIG. 6b is a simplified view of the thermally assisted magnetic head according to a second embodiment of the present invention.

As an revised embodiment as shown in FIG. 6b, a step is formed between the opposed-to-medium surfaces of the write portion 342 and the read portion 341, concretely, the distance between the opposed-to-medium surface of the write portion 342 and the magnetic recording medium surface is longer than that between the opposed-to-medium surface of the read portion 341 and the magnetic recording medium surface. Alternatively, the step can be configured within a range of 1 nm~5 nm. And the first coat layer 361 and the second coat layer 362 are formed at the same level substantially by lapping or other ways after they are deposited. The flat surface can help to control the flying height of the thermally assisted magnetic head slider 230 and avoid the thermally assisted magnetic head slider 230 touching the magnetic recording medium surface. In this embodiment, a seed layer 364 is formed on the near-field light generating surface of the plasmon unit 356 for ensuring a better adhesion between the near-field light generating surface and the second coat layer 362. Optionally, the seed layer 364 can only cover the portion of the near-field light generating surface of the plasmon unit 356 or cover the opposed-medium-surfaces of the whole write portion 342, the read portion 341 and the substrate 203 as shown in FIG. 6b. Preferably, the seed layer 364 can be made of metal, metal oxide, metal nitride, metal oxynitride or diamond-like carbon. Preferably, the seed layer 364 is made by one or more selected from Si, Al, Mg, Ta, W, Ti, Zr, ZrN, Cr, MgOx, SiNx, AlNx, AlOx, SiNxOy, AlNxOy, WOx, and diamond-like carbon. A combination of the seed layer 364 and the second coat layer 362 can be made of such as Ta, TaOx, MgOx, Al with a thickness of 0.5 nm~5 nm.

Figure 6C:
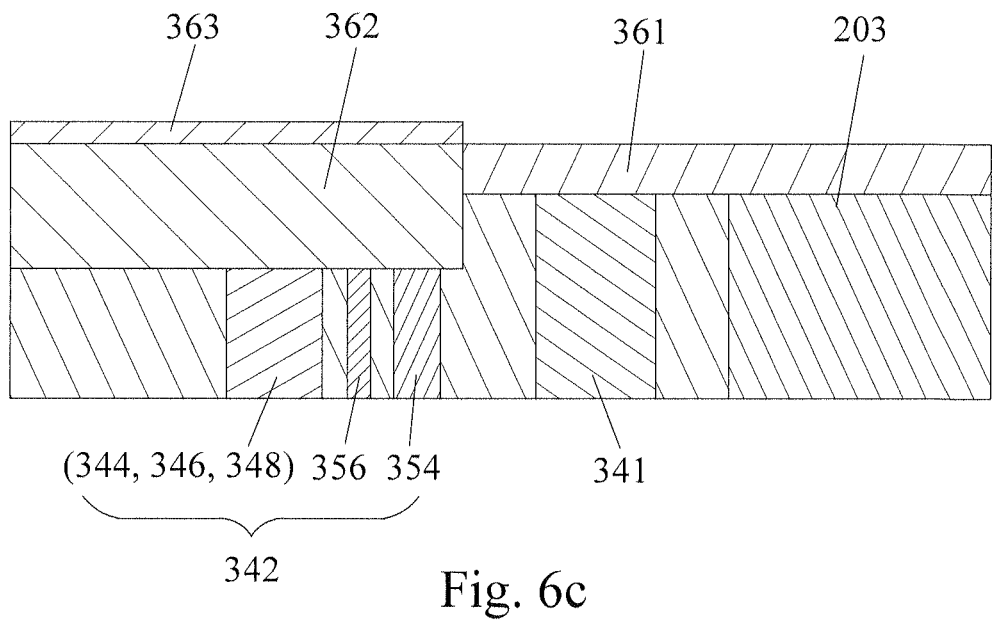
FIG. 6c is a simplified view of the thermally assisted magnetic head according to a third embodiment of the present invention.

FIG. 6c shows a preferred embodiment of the thermally assisted head 340 according to the present invention. In this embodiment, the second coat layer 362 is covered by a protective layer 363 made by high light absorption and stiff material (such as a DLC layer) whose material is similar to or the same with that of the first coat layer 361, so that the second coat layer 362 and the write portion 342 can be protected even if the write portion 342 is expanded to touch the magnetic recording medium surface unexpectedly. In this embodiment, the first coat layer 361 and the second coat layer 362 are formed at the same level basically.

Figure 6D:
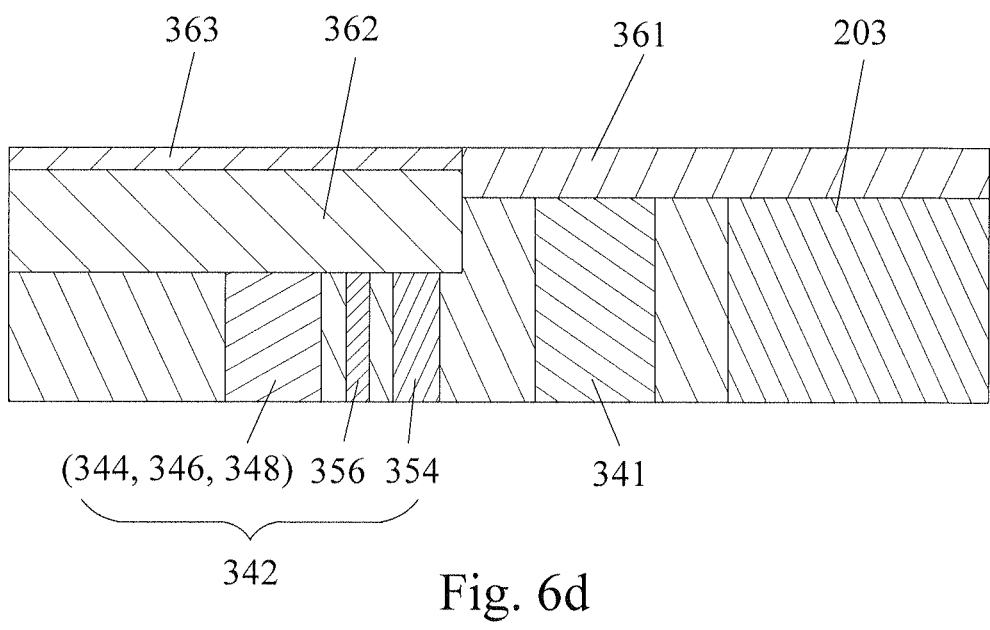
FIG. 6d is a simplified view of the thermally assisted magnetic head according to a fourth embodiment of the present invention.
Figure 6E:
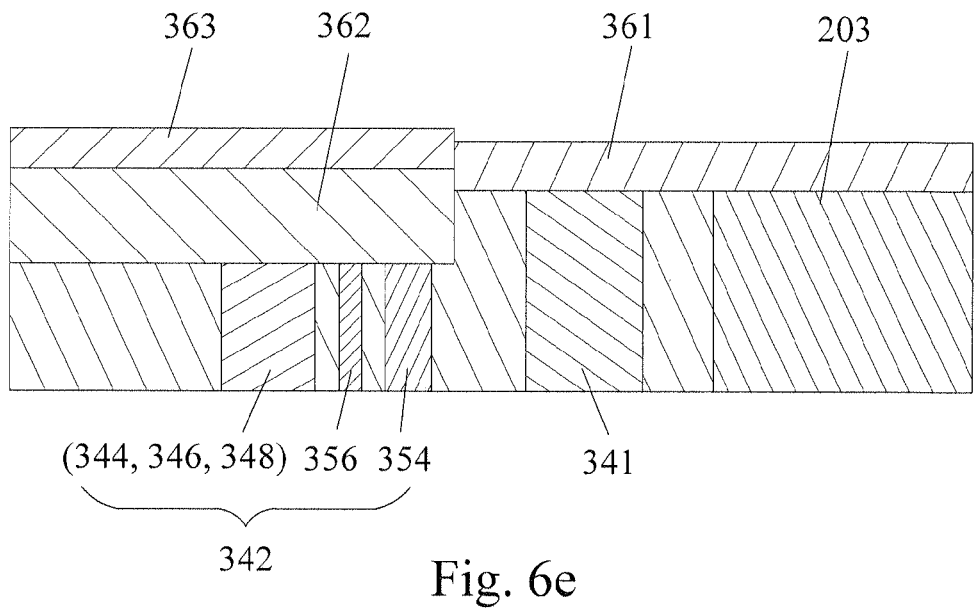
FIG. 6e is a simplified view of the thermally assisted magnetic head according to a fifth embodiment of the present invention.

FIGS. 6d-6e show two variant embodiments based on the embodiment illustrated in FIG. 6c. As illustrated in FIG. 6d, the distance between the top surface of the first coat layer 361 and the magnetic recording medium surface is shorter than that between the top surface of the second coat layer 362 and the magnetic recording medium surface, and the top surface of the protective layer 363 and the top surface of the first coat layer 361 are formed at the same level. Optionally, the top surface of the protective layer 363 and the top surface of the first coat layer 361 not at the same level, as shown in FIG. 6e. Concretely, the distance between the top surface of the first coat layer 361 and the magnetic recording medium surface is longer than that between the top surface of the protective layer 363 and the magnetic recording medium surface.

Figure 6F:
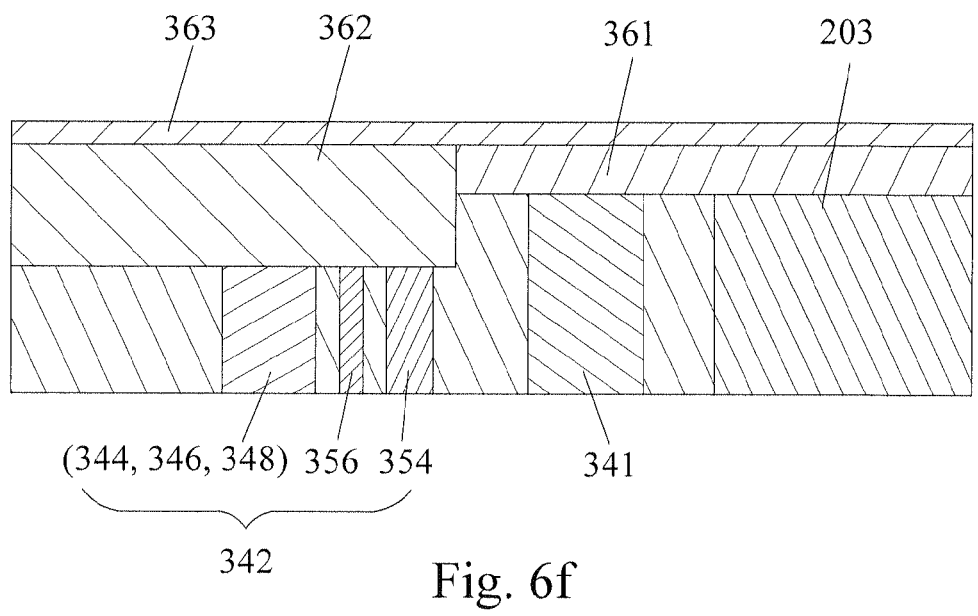
FIG. 6f is a simplified view of the thermally assisted magnetic head according to a sixth embodiment of the present invention.

More preferably, as shown in FIG. 6f, the protective layer 363 is extended to cover the first coat layer 361 and the second coat layer 362, and the protective layer 363 and the first coat layer 361 are formed at the same level substantially. It can be understood easily, the protective layer 363 has a thinner thickness than the first coat layer 361 for keep the short magnetic spacing.

Figure 6G:
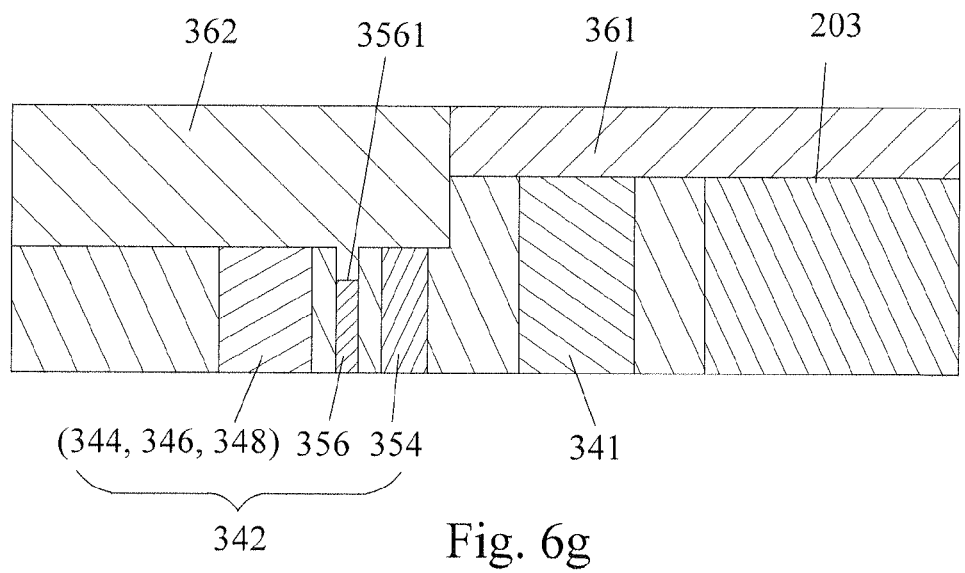
FIG. 6g is a simplified view of the thermally assisted magnetic head according to a seventh embodiment of the present invention.

For preventing the plasmon unit 356 of the write portion 342 from protruding over the ABS 241 due to its expansion in the high temperature condition during writing operation, an improved embodiment is shown in FIG. 6g. As illustrated, the plasmon unit 356 is recessed relative to the opposed-to-medium surfaces of other elements of the write portion 342. In other words, the distance between the near-field light generating surface 3561 of the plasmon unit 356 and the magnetic recording medium surface is longer than that of the opposed-to-medium surface of the write element and the magnetic recording medium surface.

Figure 6H:
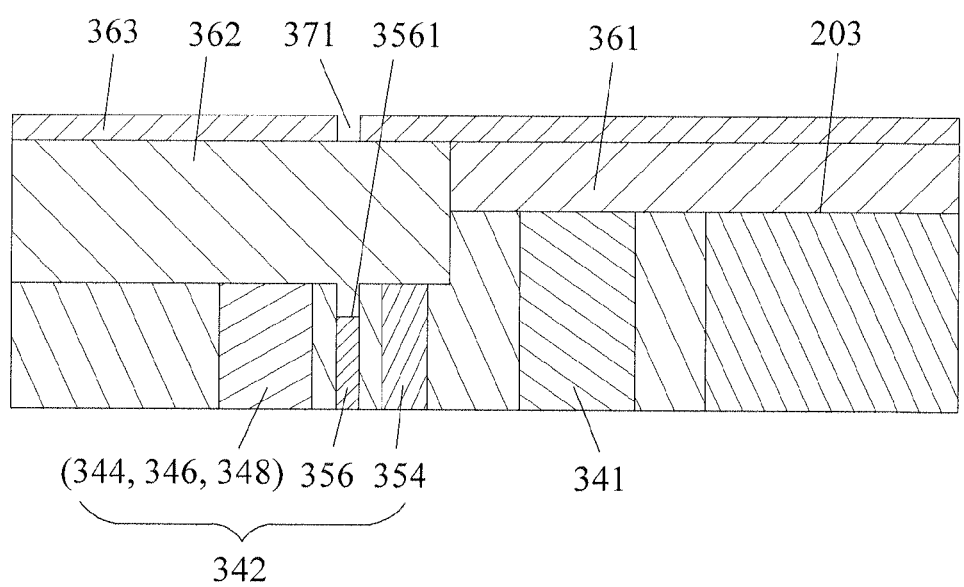
FIG. 6h is a simplified view of the thermally assisted magnetic head according to an eighth embodiment of the present invention.

FIG. 6h shows a modified embodiment basing on the embodiment shown in FIG. 6g. The protective layer 363 is deposited on the second coat layer 362 and the first coat layer 361, and a recess 371 is formed on the protective layer 363 at a position that is opposed to the plasmon unit 356.

Figure 6I:
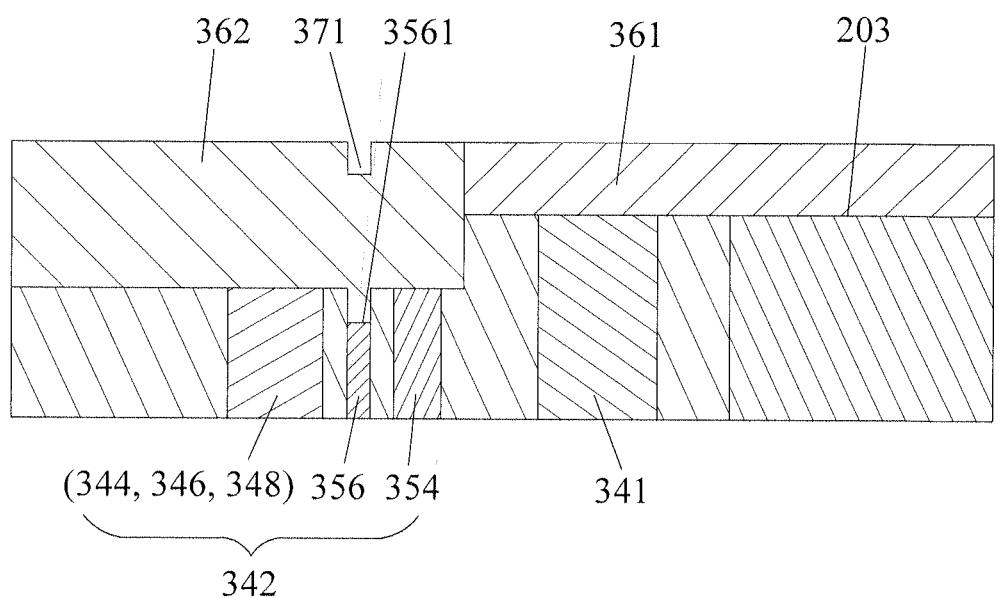
FIG. 6i is a simplified view of the thermally assisted magnetic head according to a ninth embodiment of the present invention.

FIG. 6i shows a revised embodiment basing on the embodiment shown in FIG. 6h, the difference is that, the recess 371 is extended into the second coat layer 362 for further protecting the plasmon unit 356.

Figure 7:
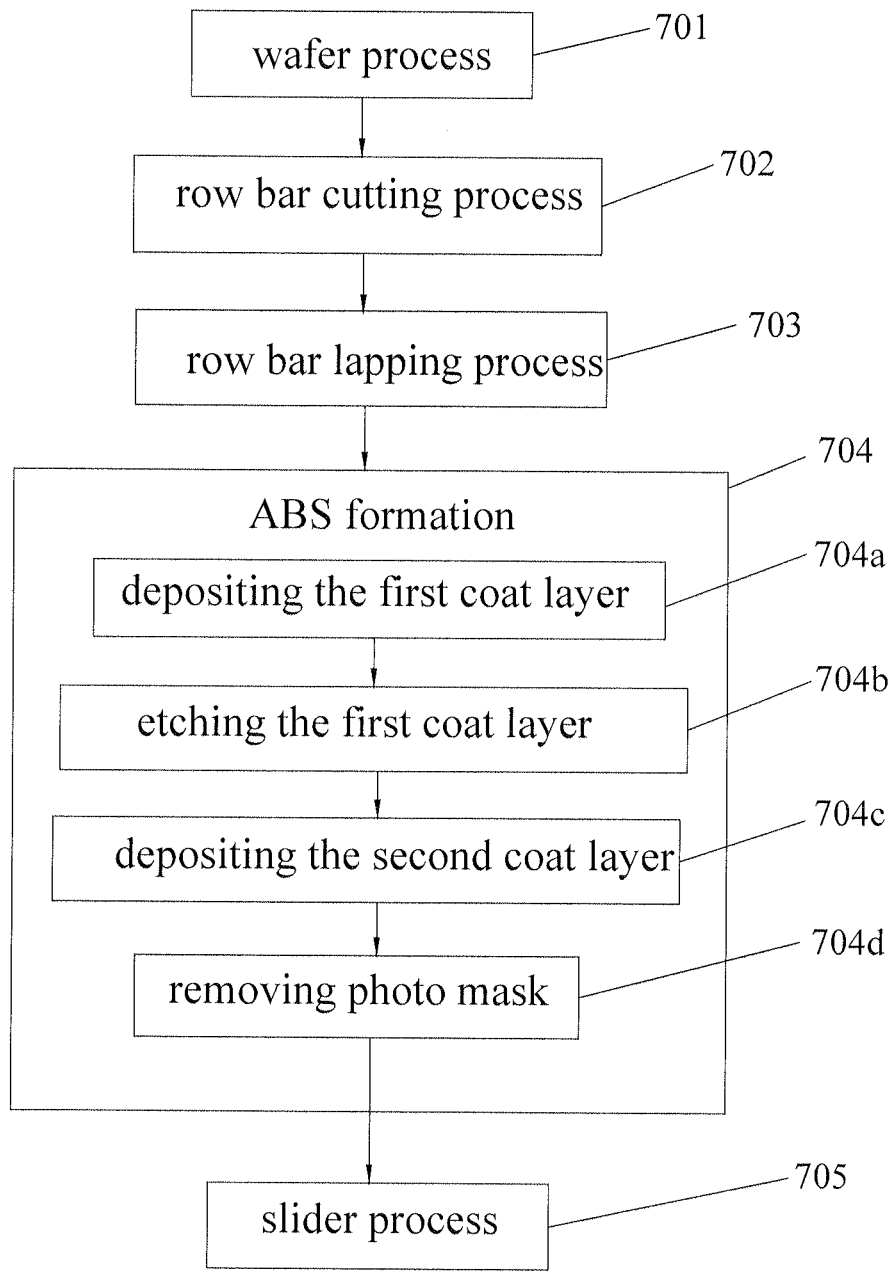
FIG. 7 is a simplified flowchart of a manufacturing method of a thermally assisted magnetic head slider according to one embodiment of the present invention.

FIG. 7 is a simplified flowchart of a manufacturing method of a thermally assisted magnetic head slider according to one embodiment of the present invention.

Step (701), wafer process. Concretely, the process includes providing a wafer with a plurality of thermally assisted magnetic head slider elements each of which has a substrate with an ABS facing to a magnetic recording medium surface, a read portion including a read element and a write portion including a write element, a waveguide, and a plasmon unit.

Step (702), row bar cutting process. In this process, the wafer is cut into a plurality of row bars with a row of thermally assisted magnetic head slider elements arranged.

Step (703), row bar lapping process. Concretely, surfaces of each row bar will be lapped in this process so as to obtain a predetermined requirement.

Step (704), ABS formation. Concretely, the process includes two main steps: depositing a first coat layer with a first thickness which has a first light absorption index on an opposed-to-medium surface of the read portion; depositing a second coat layer with a second thickness which has a second light absorption index on an opposed-to-medium surface of the read portion, the second thickness is larger than the first thickness, and the second light absorption index is smaller than the first light absorption index.

Preferably, the step (704) further includes sub-steps:

(704a) depositing the first coat layer on the opposed-to-medium surfaces of the read portion and the write portion;

(704b) etching the first coat layer covered on the write portion; concretely, it can include put a photo mask on the first coat layer and then etching the first coat layer covered on the write portion;

(704c) depositing the second coat layer on the opposed-to-medium surface of the write portion; and (704d) removing the photo mask on the first coat layer.

Concretely, after the deposition, the distance between an opposed-to-medium surface of the first coat layer and the magnetic recording medium surface is longer than that between an opposed-to-medium surface of the second coat layer and the magnetic recording medium surface.

Preferably, the first coat layer is made of high light absorption material such as SiNx, AlNx, AlOx, SiNxOy, AlNxOy, WOx, BCxNy and DLC, which is used for preventing the read portion from lacking magnet. The second coat layer is made of low light absorption material with low extinction coefficient of complex refraction index which is equal or smaller than 0.1. Specifically, such as TaOx, SiOx, AlOx, WOx, BCxNy, AlNx, SiNx, AlOxNy, SiOxNy, TiOx, MgOx and ZrOx.

Step (705), slider process. The row bar will be cut into a plurality of individual thermally assisted magnetic head slider; thereby the whole process is accomplished.

As an improved embodiment, the present invention further includes etching the opposed-to-medium surface of the write portion to form a step between the opposed-to-medium surfaces of the write portion and the read portion, after the step (703) and before the step (704).

After the first coat layer and the second coat layer are deposited on the read portion and the write portion in the steps (704a-704d), a process of forming the first, second coat layers at the same level substantially is preformed. The flat ABS achieved is helpful to control the flying height of the thermally assisted magnetic head slider.

As another improved embodiment, the present invention further includes depositing a protective layer with the first light absorption index on the second coat layer, and forming the protective layer and the first coat layer at the same level substantially after the step (704d). Preferably, the protective layer is extended to cover the first and the second coat layers.

Preferably, the method further includes forming a first recess on the protective layer at a position that is opposed to the near-field light generating surface of the plasmon unit.

As one more improved embodiment, the present invention further includes etching a second recess on a near-field light generating surface of the plasmon unit to make a distance between the near-field light generating surface and the magnetic recording medium surface be longer than that of the opposed-to-medium surface of the write element and the magnetic recording medium surface, so as to prevent the plasmon unit of the write portion from protruding over the ABS due to its expansion in the high temperature condition during writing operation.

As one more improved embodiment, the present invention further includes forming a seed layer on the near-field light generating surface of the plasmon unit. Preferably, the seed layer is extended to cover the read portion and the whole write portion.

Compared with the prior art, on one hand, since the read portion is covered by the thinner first coat layer, thus the magnetic spacing between the magnetic recording medium surface and the read element is shortened comparing with the conventional design, which can improve the reading performance of the thermally assisted magnetic head slider. On the other hand, as the write portion is covered by the thicker second coat layer with lower light absorption material, thus the thicker second coat layer can endure the high temperature generated during writing operation, which is not easy to be corrosive due to its thickness.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A thermally assisted magnetic head slider, comprising:
a substrate having a light source module mounted thereon and an air bearing surface facing to a magnetic recording medium surface;
a read portion having a read element; and
a write portion comprising a write element, a waveguide for guiding light generated by the light source module, and a plasmon unit provided around the write element and the waveguide and having a near-field light generating surface for propagating near-field light to the air bearing surface;
wherein a first coat layer with a first thickness which has a first light absorption index is covered on an opposed-to-medium surface of the read portion, and a second coat layer with a second thickness which has a second light absorption index is covered on an opposed-to medium surface of the write portion, wherein the second thickness is larger than the first thickness, and the second light absorption index is smaller than the first light absorption index.

2. The thermally assisted magnetic head slider according to claim 1, wherein a distance between the opposed-to-medium surface of the write portion and the magnetic recording medium surface is longer than that between the opposed-to-medium surface of the read portion and the magnetic recording medium surface.

3. The thermally assisted magnetic head slider according to claim 1, wherein a distance between the near-field light generating surface and the magnetic recording medium surface is longer than that of the opposed-to-medium surface of the write element and the magnetic recording medium surface.

4. The thermally assisted magnetic head slider according to claim 1, wherein a distance between an opposed-to-medium surface of the first coat layer and the magnetic recording medium surface is longer than that between an opposed-to-medium surface of the second coat layer and the magnetic recording medium surface.

5. The thermally assisted magnetic head slider according to claim 2, wherein the first coat layer and the second coat layer are formed at the same level substantially.

6. The thermally assisted magnetic head slider according to claim 2, wherein the second coat layer is covered by a protective layer.

7. The thermally assisted magnetic head slider according to claim 2, wherein the first coat layer and the second coat layer are covered by a protective layer.

8. The thermally assisted magnetic head slider according to claim 6, wherein the protective layer is recessed from a top of the air bearing surface with a predetermined distance at a position that is opposed to the near-field light generating surface of the plasmon unit.

9. The thermally assisted magnetic head slider according to claim 6, wherein the second coat layer is recessed from a top of the air bearing surface with a predetermined distance at a position that is opposed to the near-field light generating surface of the plasmon unit.

10. The thermally assisted magnetic head slider according to claim 6, wherein the protective layer includes one or more materials selected from SiNx, AlNx, AlOx, SiNxOy, AlNxOy, WOx, BCxNy and diamond-like carbon.

11. The thermally assisted magnetic head slider according to claim 1, wherein the first coat layer includes one or more materials selected from SiNx, AlNx, AlOx, SiNxOy, AlNxOy, WOx, BCxNy and diamond-like carbon.

12. The thermally assisted magnetic head slider according to claim 1, wherein the second coat layer includes one or more materials selected from TaOx, SiOx, AlOx, WOx, BCxNy, AlNx, SiNx, AlOxNy, SiOxNy, TiOx, MgOx and ZrOx.

13. The thermally assisted magnetic head slider according to claim 1, further comprising a seed layer formed on the near-field light generating surface of the plasmon unit.

14. The thermally assisted magnetic head slider according to claim 13, the seed layer includes metal, metal oxide, metal nitride, metal oxynitride or diamond-like carbon.

15. The thermally assisted magnetic head slider according to claim 1, wherein the first thickness is in a range of 0.5 nm~5 nm.

16. The thermally assisted magnetic head slider according to claim 1, wherein the second thickness is in a range of 1 nm~10 nm.

17. A head gimbal assembly, comprising a thermally assisted magnetic head slider having a substrate with a light source module mounted thereon and an air bearing surface facing to a magnetic recording medium surface, a read portion having a read element and a write portion, and a suspension supporting the thermally assisted magnetic head slider; the write portion comprising a write element, a waveguide for guiding light generated by the light source module, and a plasmon unit provided around the write portion and the waveguide and having a near-field light generating surface for propagating near-field light to the air bearing surface;
wherein a first coat layer with a first thickness which has a first light absorption index is covered on an opposed-to-medium surface of the write portion, and a second coat layer with a second thickness which has a second light absorption index is covered on an opposed-to medium surface of the read portion, wherein the first thickness is larger than the second thickness, and the first light absorption index is smaller than the second light absorption index.

18. A hard disk drive, comprising a head gimbal assembly with a thermally assisted magnetic head slider, a drive arm to connect with the head gimbal assembly, a rotatable disk, and a spindle motor to spin the disk; the thermally assisted magnetic head slider having a substrate with a light source module mounted thereon and an air bearing surface facing to a magnetic recording medium, a read portion having a read element and a write portion; the write portion comprising a write element, a waveguide for guiding light generated by the light source module, and a plasmon unit provided around the write portion and the waveguide and having a near-field light generating surface for propagating near-field light to the air bearing surface;
wherein a first coat layer with a first thickness which has a first light absorption index is covered on an opposed-to-medium surface of the write portion, and a second coat layer with a second thickness which has a second light absorption index is covered on an opposed-to medium surface of the read portion, wherein the first thickness is larger than the second thickness, and the first light absorption index is smaller than the second light absorption index.

19. A manufacturing method of a thermally assisted magnetic head slider, comprising steps of:

(a) providing a wafer with a plurality of thermally assisted magnetic head slider elements each of which has a substrate with an air bearing surface facing to a magnetic recording medium surface, a read portion including a read element and a write portion including a write element, a waveguide, and a plasmon unit;

(b) cutting the wafer into a plurality of row bars;

(c) lapping surfaces of the row bars so as to obtain a predetermined requirement;

(d) depositing a first coat layer with a first thickness which has a first light absorption index on an opposed-to-medium surface of the read portion;

(e) depositing a second coat layer with a second thickness which has a second light absorption index on an opposed-to-medium surface of the write portion, wherein the second thickness is larger than the first thickness, and the second light absorption index is smaller than the first light absorption index; and (f) cutting the row bar into a plurality of individual thermally assisted magnetic head slider.

20. The manufacturing method according to claim 19, wherein the steps (d) and (e) comprises sub-steps:

(d1) depositing the first coat layer on the opposed-to-medium surfaces of the read portion and the write portion;

(d2) etching the first coat layer covered on the write portion; and (e1) depositing the second coat layer on the opposed-to-medium surface of the write portion.

21. The manufacturing method according to claim 20, wherein etching way in the sub-step (d2) includes photo masking.

22. The manufacturing method according to claim 20, further comprising etching the opposed-to-medium surface of the write portion to form a step between the opposed-to-medium surfaces of the write portion and the read portion after the step (c) and before the step (f).

23. The manufacturing method according to claim 22, further comprising forming the first coat layer and the second coat layer at the same level substantially.

24. The manufacturing method according to claim 22, further comprising forming a protective layer on the second coat layer.

25. The manufacturing method according to claim 22, further comprising forming a protective layer on the first and second coat layers.

26. The manufacturing method according to claim 24, further comprising forming a recess on the protective layer at a position that is opposed to the near-field light generating surface of the plasmon unit.

27. The manufacturing method according to claim 24, further comprising forming a recess on the second coat layer at a position that is opposed to the near-field light generating surface of the plasmon unit.

28. The manufacturing method according to claim 19, further comprising forming a seed layer on the near-field light generating surface of the plasmon unit.

29. The manufacturing method according to claim 19, further comprising forming a recess on a near-field light generating surface of the plasmon unit to make a distance between the near-field light generating surface and the magnetic recording medium surface be longer than that of the opposed-to-medium surface of the write element and the magnetic recording medium surface.

30. The manufacturing method according to claim 19, wherein a distance between an opposed-to-medium surface of the first coat layer and the magnetic recording medium surface is longer than that between an opposed-to-medium surface of the second coat layer and the magnetic recording medium surface.

* * * * *